United States Patent
McAllister et al.

(10) Patent No.: US 8,418,154 B2
(45) Date of Patent: Apr. 9, 2013

(54) FAST VECTOR MASKING ALGORITHM FOR CONDITIONAL DATA SELECTION IN SIMD ARCHITECTURES

(75) Inventors: Jeffrey S. McAllister, Saint Paul, MN (US); Nelson Ramirez, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1044 days.

(21) Appl. No.: 12/368,409

(22) Filed: Feb. 10, 2009

(65) Prior Publication Data

US 2010/0205585 A1 Aug. 12, 2010

(51) Int. Cl.
*G06F 9/38* (2006.01)
(52) U.S. Cl.
USPC .......................................... 717/140; 712/234
(58) Field of Classification Search .......................... None
See application file for complete search history.

(56) References Cited

U.S. PATENT DOCUMENTS

| | | | | |
|---|---|---|---|---|
| 5,604,913 | A | * | 2/1997 | Koyanagi et al. .................. 712/5 |
| 5,778,241 | A | * | 7/1998 | Bindloss et al. ................. 712/20 |
| 7,945,766 | B2 | * | 5/2011 | Yoshida ......................... 712/222 |
| 2004/0001066 | A1 | * | 1/2004 | Bik et al. ....................... 345/505 |

\* cited by examiner

*Primary Examiner* — Don Wong
*Assistant Examiner* — Deric Ortiz
(74) *Attorney, Agent, or Firm* — Patterson & Sheridan LLP (57) ABSTRACT

Techniques are disclosed for generating fast vector masking SIMD code corresponding to source code having a conditional statement, where the SIMD code replaces the conditional statements with vector SIMD operations. One technique includes performing conditional masking using vector operations, bit masking operations, and bitwise logical operations. The need for conditional statements in SIMD code is thereby removed, allowing SIMD hardware to avoid having to use branch prediction. This reduces the number of pipeline stalls and results in increased utilization of the SIMD computational units.

21 Claims, 7 Drawing Sheets

SIMD OPERATION EXAMPLES 300

| SIMD OPERATION | EFFECT |
|---|---|
| vec_and(a, b) | (a1, a2, a3, a4) & (b1, b2, b3, b4) |
| vec_andc(a, b) | (a1, a2, a3, a4) & ~(b1, b2, b3, b4) |
| vec_or(a, b) | (a1, a2, a3, a4) | (b1, b2, b3, b4) |
| vec_add(a, b) | (a1, a2, a3, a4) + (b1, b2, b3, b4) |
| vec_mul(a, b) | (a1, a2, a3, a4) * (b1, b2, b3, b4) |

MASK EXAMPLES

SCALAR MASK EXAMPLES =
data[i] & mask[j]    ~415    // Bitwise AND operation. data[i] and mask[j] are scalars.

mask[j] = 1          // scalar data[i] is selected
mask[j] = 0          // scalar data[i] is not selected

VECTOR MASK EXAMPLES =
vec_and(data[i], mask[j])    ~435    // Bitwise AND SIMD operation for vectors. data[i] and mask[j] are vectors.

// 32-bit SIMD vectors (with four 8-bit elements)
mask[j] = 0x FF FF FF FF    ~440    // All data within the vector data[i] is selected
mask[j] = 0x FF 00 FF 00    ~442    // Element 0 and element 2 within the vector data[i] are selected
mask[j] = 0x 00 00 00 00    ~444    // No data within the vector is selected // 128-bit SIMD vectors (with four 32-bit elements)
mask[j] = 0x FFFFFFFF FFFFFFFF FFFFFFFF FFFFFFFF    ~450    // All data within the vector data[i] is selected
mask[j] = 0x 00000000 FFFFFFFF 00000000 FFFFFFFF    ~452    // Element 1 and element 3 within the vector data[i] are selected
mask[j] = 0x 00000000 00000000 00000000 00000000    ~454    // No data within the vector data[i] is selected

FIG. 4

Base case: IF block (no ELSE clause)

515 {
```
// Scalar code (pseudocode)
unsigned int mask[100];    // When the same mask needs to be applied repeatedly. Contains 0 or 1.
float data[100000];
float result[100000];
```
510

520 {
```
for (int i = 0; i < 100000; i++) {
    if (mask[i % 100] == 1) {
        perform some computation with data[i], storing into result[i]
    }
    // no else clause
}
```

555 {
```
// SIMD version (pseudocode)
vector float mask[100];      // When same mask needs to be applied repeatedly. Contains 0 or 0xFFFFFFFF (vector float).
vector float data[25000];    // 4 floats fit in each vector, therefore loop is 1/4th of scalar loop
vector float result[25000];
vector float ifBranch, maskedifBranch, maskedElseBranch;
```
550

560 {
```
// the following occurs inside a particular iteration of a for loop
// the value of mask[j] = 0x FFFFFFFF 00000000 FFFFFFFF 00000000          // for 128-bit SIMD vectors
maskedElseBranch = vec_andc(data[i], mask[j])                              // 0, d2, 0, d4
ifBranch = perform all computations with data[i] as if there were no condition on the execution of the work   // r1, r2, r3, r4
maskedifBranch = vec_and(ifBranch, mask[j])                                // r1, 0, r3, 0
result[j] = vec_or(maskedElseBranch, maskedifBranch)                       // r1, d2, r3, d4
// end for loop
```

FIG. 5

General case: IF-ELSE block                                                                                                600

// Scalar code
unsigned int mask[100]; // When the same mask needs to be applied repeatedly. Contains 0 or 1.
float data[100000];
float result[100000];

void main (int argc, char ** argv) {
    for (int i = 0; i < 100000; i++) {                                          ⎫
        if (mask[i % 100] == 1) {                                               ⎬ 610
            result[i] = 5 * data[i];                                            ⎪
        }                                                                       ⎪
        else {                                                                  ⎪
            result[i] = 7 * data[i];                                            ⎪
        }                                                                       ⎪
    }                                                                           ⎭
}

615 ⎱ (scalar declarations)
620 ⎱ (scalar loop body)

// SIMD version
vector float mask[100];         // When same mask needs to be applied repeatedly. Contains 0 or 0xFFFFFFFF (vector float).
vector float data[25000];       // 4 floats fit in each vector, therefore loop is 1/4th of scalar loop
vector float result[25000];
vector float elseData, ifBranch, elseBranch, maskedifBranch, maskedElseBranch;

void main (int argc, char ** argv) {
    for (int i = 0; i < 25000; i++) {
        elseData = vec_andc(data[i], mask[i %100]);
        // the above step (elseData) is optional in the general case
        ifBranch = vec_mul(data[i], (vector float) 5.0);
        elseBranch = vec_mul(data[i], (vector float) 7.0);
        maskedifBranch = vec_and(ifBranch, mask[i %100]);
        maskedElseBranch = vec_andc(elseBranch, mask[i %100]);
        result[i] = vec_or(maskedifBranch, maskedElseBranch);
    }
}

655 (SIMD declarations)
660 (SIMD loop body)

650: // Note: mask[0] = 0x FFFFFFFF 00000000 FFFFFFFF 00000000
     // Example data for first iteration: d1, d2, d3, d4
     // d1, d2, d3, d4 & ~ (mask[i %100]) = 0, d2, 0, d4
     // Example output for first iteration:
     // $r_{if}\,1, r_{if}\,2, r_{if}\,3, r_{if}\,4$                (first path calculated)
     // $r_{else}\,1, r_{else}\,2, r_{else}\,3, r_{else}\,4$        (second path calculated)
     // $r_{if}\,1, 0, r_{if}\,3, 0$                                (apply mask)
     // $0, r_{else}\,2, 0, r_{else}\,4$                            (apply inverse of mask)
     // $r_{if}\,1, r_{else}\,2, r_{if}\,3, r_{else}\,4$            (result)

FAST VECTOR MASKING ALGORITHM FOR CONDITIONAL DATA SELECTION IN SIMD ARCHITECTURES

FIELD OF THE INVENTION

Embodiments of the invention generally relate to compilers. More specifically, embodiments of the invention relate to a fast vector masking algorithm for conditional data selection in SIMD architectures without conditional statements.

DESCRIPTION OF THE RELATED ART

Some currently available processors support "single instruction, multiple data" (SIMD) extensions. SIMD indicates that a single instruction operates on multiple data items in parallel. For example, an "add" SIMD instruction may add eight 16 bit values in parallel. That is, the add operation (a single operation) is performed for eight distinct sets of data values (multiple data). Typically, the data values may be supplied as elements of a vector. Accordingly, SIMD processing is also referred to as vector processing. SIMD instructions dramatically increase execution speed by performing multiple operations as part of an instruction. Well known examples of SIMD extensions include multimedia extension ("MMX") instructions, SSE instructions, and vectored multimedia extension ("VMX") instructions.

Porting code with many conditional statements to SIMD pipelined architectures creates performance issues. The conditional statements are a source of such performance issues because each conditional statement is fundamentally a scalar operation, aside from the pipeline efficiency loss for each conditional check. A low utilization of the SIMD parallel computational units may result. Moreover, although branch prediction may be implemented in hardware, branch prediction for a SIMD vector processing unit may be costly to implement.

SUMMARY OF THE INVENTION

One embodiment of the invention includes a method for generating a vector masking source code from scalar source code containing a conditional statement. The method may generally include receiving the scalar source code containing a conditional statement. Each branch of the conditional statement may contain a scalar data structure and specify a scalar operation operating on the scalar data structure in a respective branch. The method may further include generating the vector masking source code. Generating the vector masking source code may include generating, for each branch of the conditional statement, a vector data structure that corresponds to the scalar data structure in the respective branch of the conditional statement and generating, for each branch of the conditional statement, a vector operation that corresponds to the scalar operation in the respective branch of the conditional statement. The scalar operation operates on the scalar data structure and the vector operation operates on the vector data structure to compute a result for the respective branch of the conditional statement. Generating the vector masking source code may further include generating at least one bitwise operation that computes a final result from the respective results for each branch of the conditional statement and outputting the generated vector masking source code.

Still another embodiment of the invention includes a computer readable storage medium containing a program which, when executed, performs an operation for generating a vector masking source code from a scalar source code containing a conditional statement. The operation may generally include receiving the scalar source code containing a conditional statement. Each branch of the conditional statement may contain a scalar data structure and specify a scalar operation operating on the scalar data structure in a respective branch. The operation may further include generating the vector masking source code. Generating the vector masking source code may include generating, for each branch of the conditional statement, a vector data structure that corresponds to the scalar data structure in the respective branch of the conditional statement and generating, for each branch of the conditional statement, a vector operation that corresponds to the scalar operation in the respective branch of the conditional statement. The scalar operation operates on the scalar data structure and the vector operation operates on the vector data structure to compute a result for the respective branch of the conditional statement. Generating the vector masking source code may further include generating at least one bitwise operation that computes a final result from the respective results for each branch of the conditional statement and outputting the generated vector masking source code.

Still another embodiment of the invention includes a system having a processor and a memory containing a program, which when executed by the processor is configured to perform an operation for generating a vector masking source code from a scalar source code containing a conditional statement. The operation may generally include receiving the scalar source code containing a conditional statement. Each branch of the conditional statement may contain a scalar data structure and specify a scalar operation operating on the scalar data structure in a respective branch. The operation may further include generating the vector masking source code. Generating the vector masking source code may include generating, for each branch of the conditional statement, a vector data structure that corresponds to the scalar data structure in the respective branch of the conditional statement and generating, for each branch of the conditional statement, a vector operation that corresponds to the scalar operation in the respective branch of the conditional statement. The scalar operation operates on the scalar data structure and the vector operation operates on the vector data structure to compute a result for the respective branch of the conditional statement. Generating the vector masking source code may further include generating at least one bitwise operation that computes a final result from the respective results for each branch of the conditional statement and outputting the generated vector masking source code.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6 illustrates another example of scalar code and corresponding SIMD code with vector masking for an IF-ELSE block, according to one embodiment of the invention.

DETAILED DESCRIPTION OF THE PREFERRED EMBODIMENTS

Embodiments of the invention provide techniques for performing conditional masking without conditional statements in a SIMD parallel vector processor. In one embodiment, a technique is provided for generating fast vector masking SIMD code without conditional statements. A SIMD code generator may be configured to identify conditional statements within source code and generate SIMD code that still performs conditional data selection but nevertheless removes the conditional statements.

Many operations require a large number of conditional statements, such as a masking operation. For an n element mask, there needs to be a set of n conditional statements checking a conditional variable to determine if a certain action is to be taken with a piece of input data. In lieu of the conditional checks, embodiments of the invention convert the conditional checks into a set of vector operations, bit masking operations, and bitwise logical operations. While this may result in a raw increase in the number of instructions, in porting code to run on a SIMD vector processing unit, adding some additional computational steps is often superior to performing many conditional statements.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
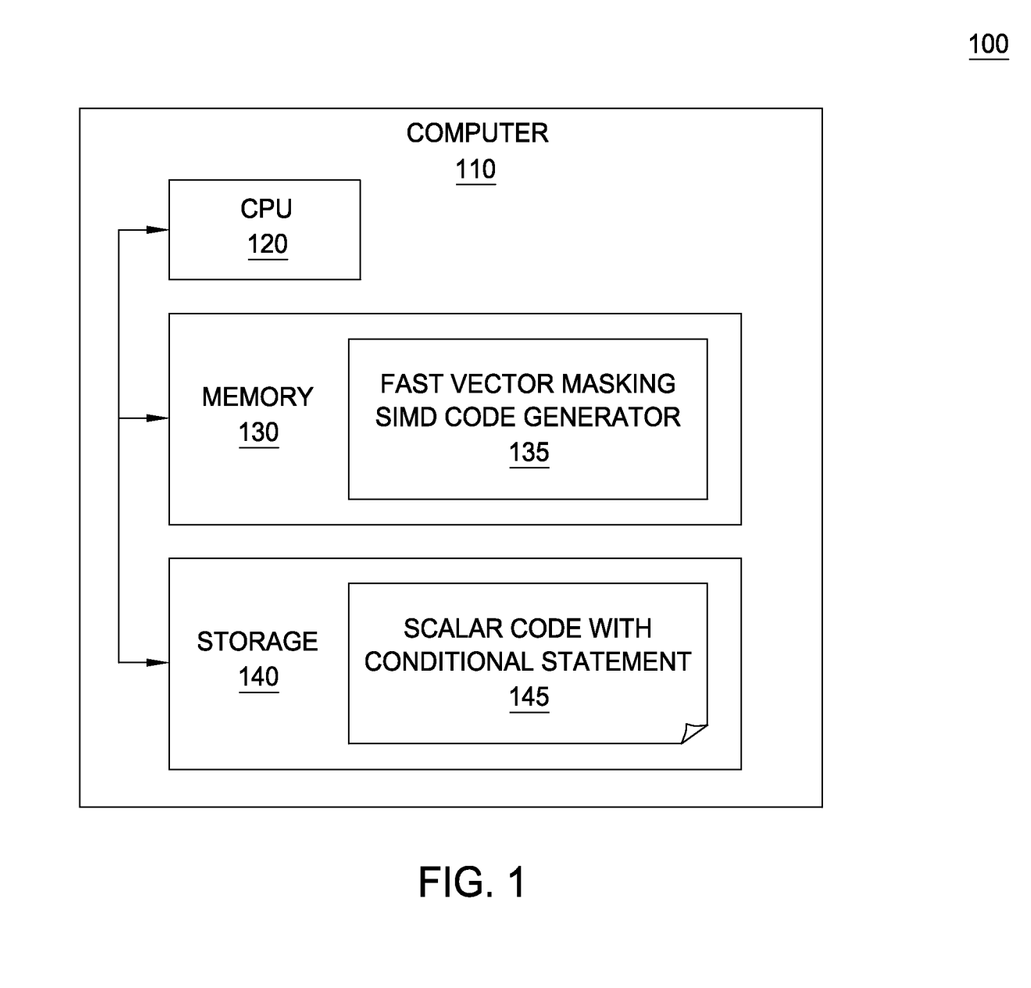
FIG. 1 is an architectural diagram that illustrates a fast vector masking SIMD code generator running in a computing environment, according to one embodiment of the invention.

FIG. 1 is an architectural diagram that illustrates a fast vector masking SIMD code generator 135 running in a computing environment 100, according to one embodiment of the invention. As shown, the computing environment 100 includes computer 110. In one embodiment, the computer system illustrated in computing environment 100 may include existing computer systems, e.g., a desktop computer, a server computer, a laptop computer, a tablet computer, and the like. The computing environment 100 illustrated in FIG. 1, however, is merely an example of one computing environment. Embodiments of the present invention may be adapted for use with other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language and may be adapted to take advantage of new computing systems as they become available.

As shown, the computer 110 includes a central processing unit (CPU) 120 which obtains instructions and data from a memory 130 and storage 140. The CPU 120 is a programmable logic device that performs all the instruction, logic, and mathematical processing in a computer. For purposes of this description, CPU 120 is presumed to support some SIMD extensions (e.g., include multimedia extension ("MMX")

instructions, SSE instructions, or vectored multimedia extension ("VMX") instructions.) The storage 140 stores application programs and data for use by the computer 110. In one embodiment, the storage system illustrated in computing environment 100 may include existing storage systems, e.g., hard-disk drives, flash memory devices, optical media, and the like. As shown, the storage 140 includes application source code with a conditional statement 145. As is known most (if not all) programming languages support conditional statements. For example, the C++ like syntax of "If (condition) {perform some action;}" is used to selectively execute the "action" based on evaluation that the "condition" exists (or is true). More complex conditions may be constructed using "IF" "ELSEIF" and "ESLE" statements or "SWITCH" and "CASE" statements. Frequently, developers use a mask in conjunction with a set of "IF" statements to determine an action to perform, based on the value in a variable. As a simple example, assume a four-bit mask of (0000). In such a case, each bit in the mask may be used to specify that a particular action be performed. Assuming that only one action should be performed leads to a mask that may have the following values:

TABLE I 4-bit Mask Example

| 0001 | invoke SIMD function A |
|------|------------------------|
| 0010 | invoke SIMD function B |
| 0100 | invoke SIMD function C |
| 1000 | invoke SIMD function D |

In such a case, source code syntax like the following may use to conditional mask to select what SIMD function to invoke, based on the variable foo:

TABLE II 4-bit Mask Example - source code

```
mask[ ] = { 0x0001, 0x0010, 0x0100, 0x1000 };
If   (foo & mask[0])
    { //invoke SIMD function A;}
elseif (foo & mask[1])
    { // invoke SIMD function B;}
elseif (foo & mask[2])
    { // invoke SIMD function C;}
else (foo & mask[3])
    { // invoke SIMD function D;}
```

As this simple example illustrates, while the source code in Table II exploits SIMD functionality, it does so only after performing at least one, and as many as four, conditional statements. Thus, the efficiency of using the SIMD processing capability of CPU 120 may be greatly diminished.

As shown, Memory 130 includes a fast vector-masking SIMD code generator 135 and an operating system (not shown). An operating system is the software used for managing the operation of computer 110. Examples of operating systems include UNIX, a version of the Microsoft Windows® operating system, and distributions of the Linux® operating system. (Note: Linux is a trademark of Linus Torvalds in the United States and other countries.)

In one embodiment, the fast vector-masking SIMD code generator 135 receives the scalar code with conditional statement 145 (e.g., the source code in Table II). As described in greater detail below, the fast vector masking SIMD code generator 135 may evaluate application source code to identify conditional statements that may be removed and replaced using a fast-vector masking algorithm for conditional data selection without conditional statements.

Figure 2:
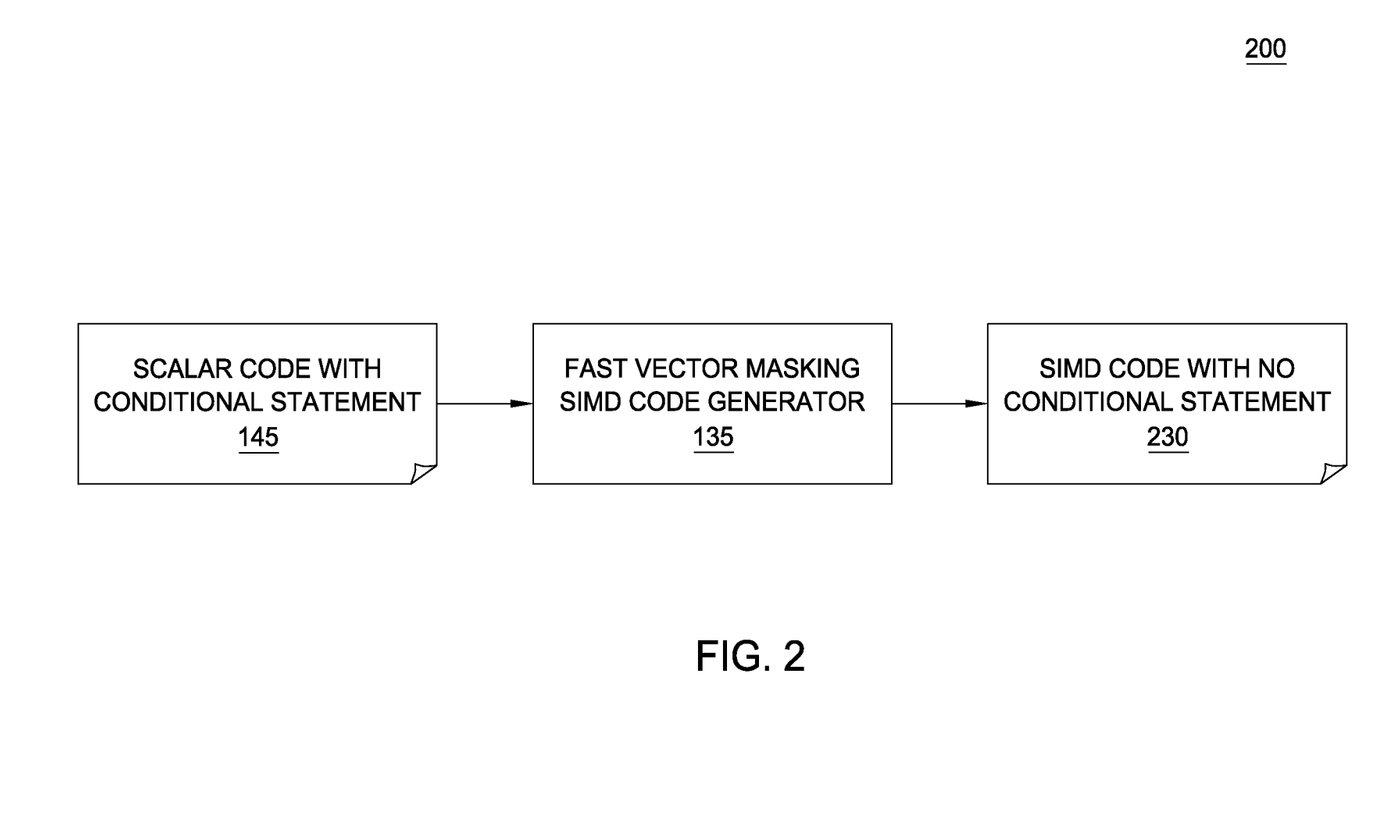
FIG. 2 is a block diagram that illustrates a data flow of the fast vector masking SIMD code generator, according to one embodiment of the invention.

FIG. 2 shows an illustrative data flow 200 for the fast vector masking SIMD code generator 135, according to one embodiment of the invention. The data flow 200 includes scalar code 145 with a conditional statement. That is, scalar code 145 represents application source code that may include a mix of both scalar operations (e.g., conditional statements) and vector operations (e.g., SIMD instructions). The fast vector masking SIMD code generator 135 receives, as input, the scalar code 145. The fast vector masking SIMD code generator 135 generates, as output, application source code optimized for SIMD operations, i.e., SIMD code 230 without the conditional statement present in scalar code 145. The SIMD code 230 achieves the same result as the scalar code 145, but does so without the use of the conditional statement.

Figure 3:
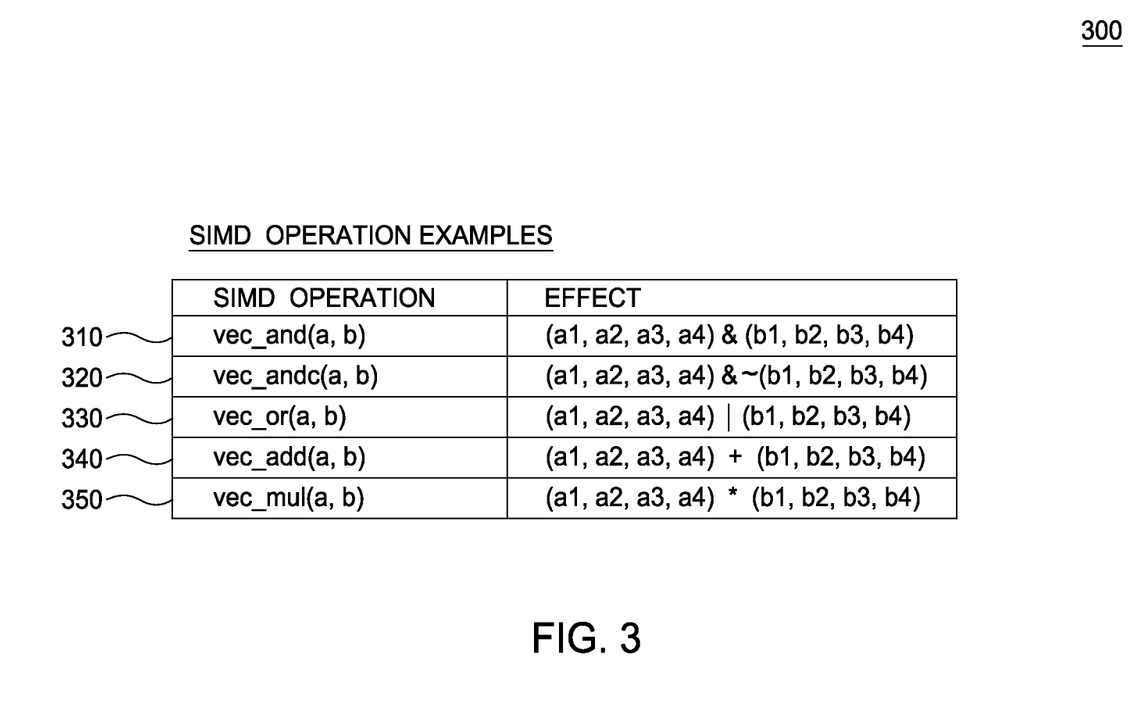
FIG. 3 is a table that displays exemplary SIMD operations, according to one embodiment of the invention.

In one embodiment, the fast vector masking SIMD code generator 135 generates SIMD code 230 that includes one or more SIMD operations. For example, FIG. 3 shows a table displaying an example set of SIMD operations, according to one embodiment of the invention. As shown, a SIMD operation vec_and( ) 310 computes a bitwise AND of the components of two input vectors (vector a and vector b). SIMD operation vec_andc( ) 320 computes a bitwise AND between input vector a and the complement of input vector b. Similarly, a SIMD operation vec_or( ) 330 computes a bitwise OR between inpout vector a and input vector b. SIMD operation vec_add( ) 340 adds the respective components of input vector a and input vector b. Finally, a SIMD operation vec_mul( ) 350 multiplies respective components of input vector a and input vector b.

Of course, embodiments described herein are intended to be illustrative and not limiting of the invention, and other embodiments are broadly contemplated. Those skilled in the art will recognize, for example, that a variety of other SIMD operations, such as vector subtraction and vector exclusive OR, may be supported by embodiments of the invention.

In one embodiment, the fast vector masking SIMD code generator 135 accepts, as input, the scalar code 145 that applies a mask to data. When a mask is applied to data, the mask determines which branch of the conditional statement to execute. In effect, the mask determines what data is selected and/or modified by the conditional statement.

Figure 4:
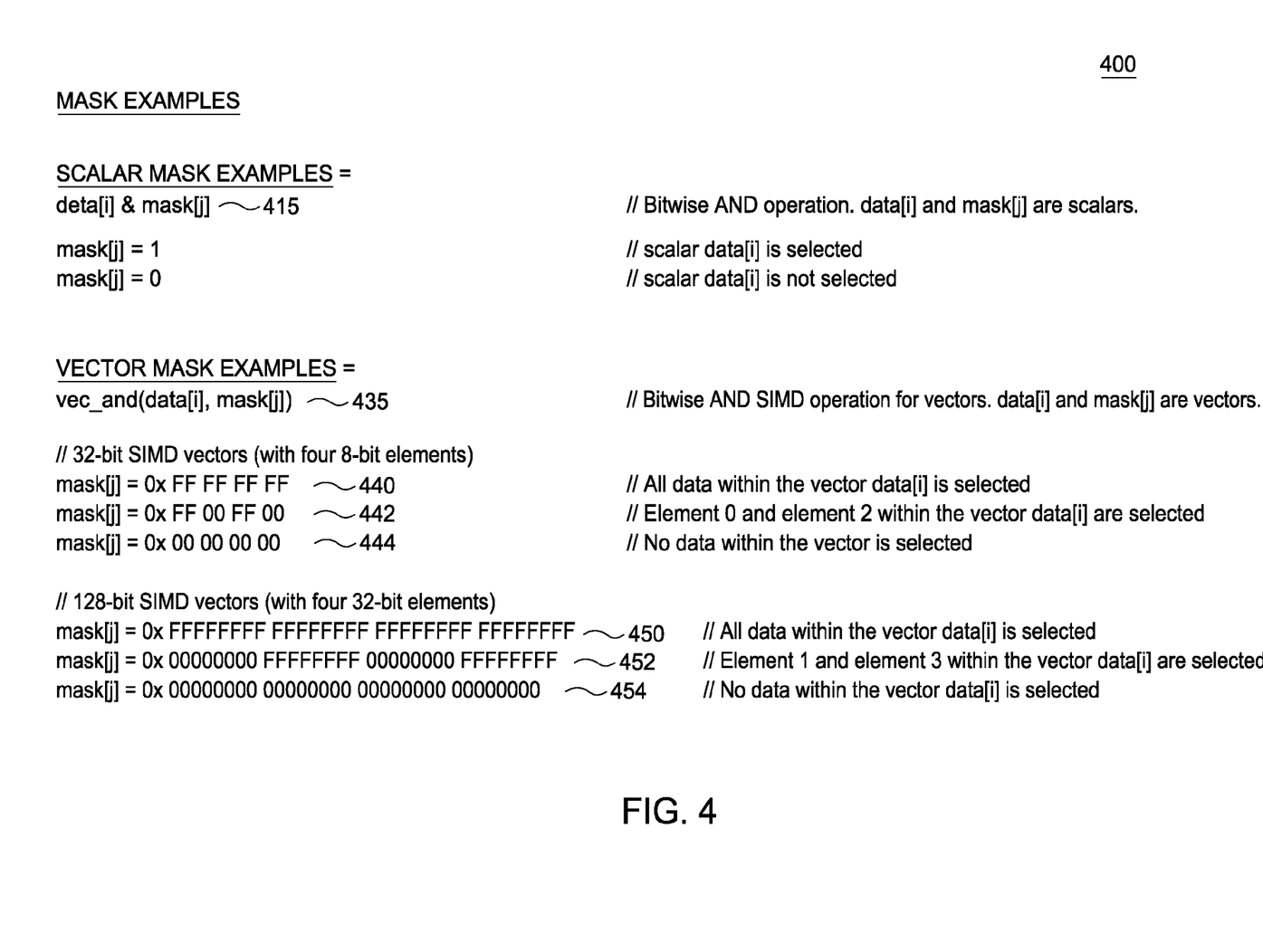
FIG. 4 illustrates examples of both a scalar mask between elements of two arrays and of vector masks, according to one embodiment of the invention.

FIG. 4 illustrates examples of both scalar masks and vector masks, according to embodiments of the invention. As shown, a scalar operation 415 may be performed by ANDing the value mask[j] with the value data[i]. In this example, both data[i] and mask[j] are scalar values of the arrays data[] and mask[]. Depending on the value of mask[j], the value of data[i] is selected or not selected (or some action may be performed). Illustratively, if the mask[j] value is 1, the scalar data stored in data[i] is selected. Otherwise, if the mask[j] value is 0, the scalar data stored in data[i] is not selected. FIG. 4 also shows examples of vector masks. As shown, a vector AND (vec_and( )) operation 435 is performed using input vectors data[i] and mask[j]. A first example shows mask[j] as a 32 bit SIMD vector storing four 8-bit elements. Illustratively, for 32-bit SIMD vectors with four 8-bit elements, vector mask values are shown that select all data elements (vector mask 440), data elements 0 and 2 (vector mask 442), and data elements 1 and 3 (vector mask 444). A second example for 128-bit SIMD vectors with four 32-bit elements, vector mask values are shown that select all data elements (vector mask 450), data elements 1 and 3 (vector mask 452), and no data elements (vector mask 454).

Of course, the embodiments described herein are intended to be illustrative and not limiting of the invention, and other embodiments are broadly contemplated. Those skilled in the art will recognize, for example, that embodiments of the invention may support SIMD vectors of bit lengths other than 32 and 128.

Figure 5:
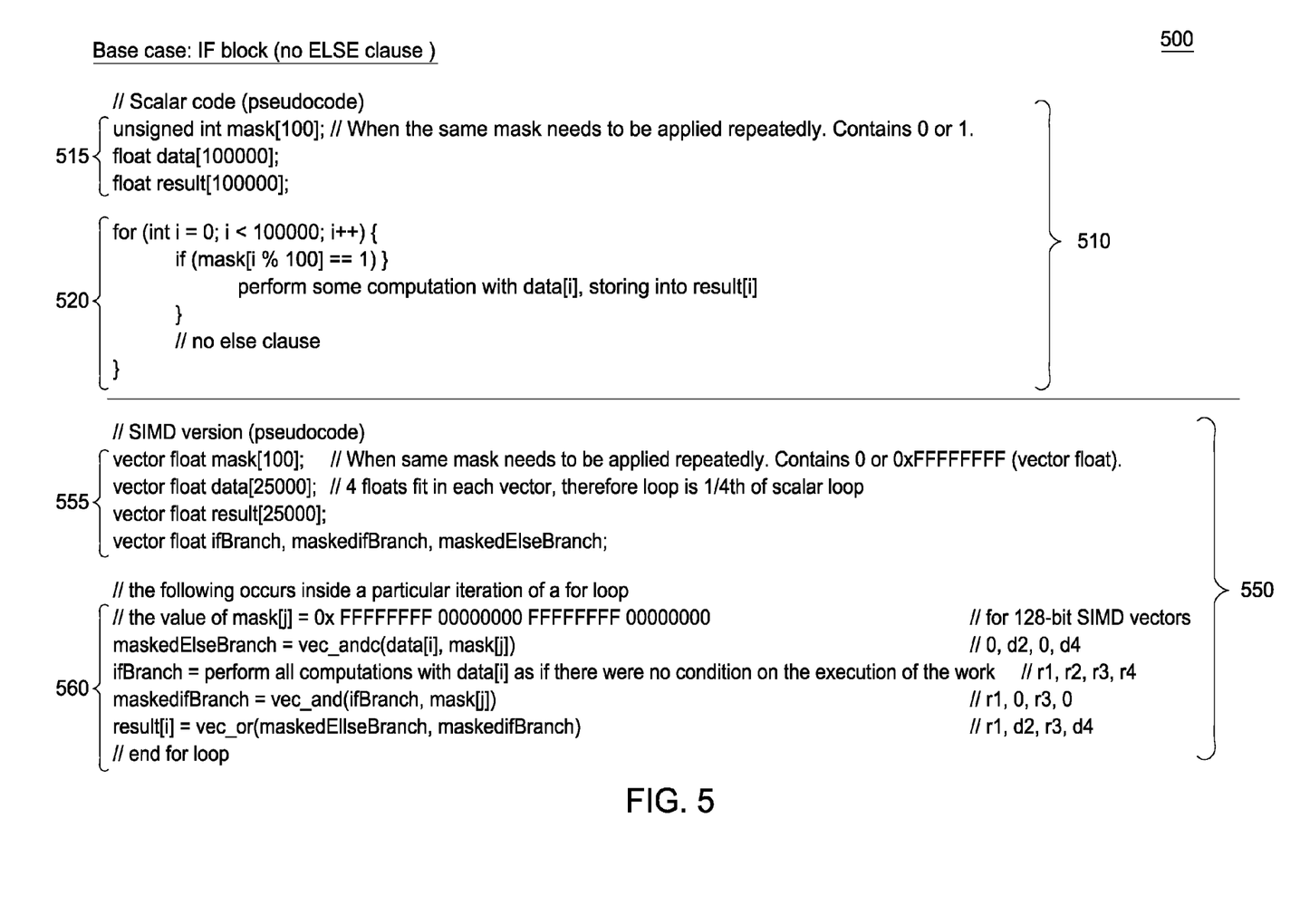
FIG. 5 illustrates an example of scalar pseudocode and corresponding SIMD pseudocode, according to one embodiment of the invention.

FIG. 5 illustrates an example of pseudocode 510 which includes a scalar conditional statement, according to one embodiment of the invention. In particular, pseudocode 510 includes an IF block with no ELSE clause. In this example, pseudocode 510 includes variable declarations 515 for a mask vector (mask[]), an input vector (data[]), and an output vector (result[]). Pseudocode 510 also includes a loop 520 (the for statement) that evaluates an element in the data[] vector through each pass of the for loop. First, the mask[] vector is used in a conditional statement (if (mask[i] % 100]==1)), which, if satisfied, results in an operation being performed on the $i^{th}$ an element of the data[] vector and stored in the $i^{th}$ element of the result[] vector. More simply, the mask vector determines whether a computation is performed on an input array and stored in an output array.

FIG. 5 also illustrates an example of SIMD pseudocode 550, representing source code generated to replace the scalar IF statement included in the loop 520 of pseudocode 510. That is, the SIMD pseudocode 550 may achieve the same result as pseudocode 510, but without the use of the conditional "IF" statement. As shown, the SIMD pseudocode 550 includes variable declarations 555 for a mask[] vector, a data[] vector, and a result[] vector. The SIMD pseudocode 550 also includes a loop 560 generated to replace the for loop containing a conditional IF statement from pseudocode 510. Inside a particular iteration of loop 560, the mask (the $j^{th}$ element of the mask[] vector) is used to specify that processing operations should be performed on the 0 and 2 elements of the data[] vector. Note, in this example, each element of the data[] variable is a four-element vector of floating point numbers, referenced herein as <d1, d2, d3, d4>. Next, the maskedElseBranch variable is assigned the result of a vector AND COMPLEMENT operation (vec_andc) between data[i] and mask[j]. Specifically, the complemented value of the mask[j] is applied to the maskedElseBranch vector. In this Example, maskedElseBranch stores <0, d2, 0, d4>. That is, the d2 and d4 are copied from the data[i] vector into the maskedElseBranch vector.

Next, a vector float variable "ifBranch" is assigned a value computed using the $i^{th}$ element of the data[] vector. This results in a vector storing <r1, r2, r3, r4> where each "r" value stores a result achieved by evaluating the corresponding value in the data[i] vector. That is, operations otherwise only performed for elements of the vector that satisfy the conditional statement are instead performed on each element of the data [i] vector. Then, a vector float variable maskedIfBranch is assigned the results of a vector AND operation (vec_and) performed using the ifBranch vector float variable and the $j^{th}$ element of the mask[] vector. This results in a vector with <r1, 0, r3, 0> values. That is, the value of the mask[j] is applied to the ifBranch vector. Lastly, a value for the $i^{th}$ value of the result vector is assigned the results of a vector OR operation (vec_or). The vector OR operation assigns a result value by ORing the results of the maskedElseBranch vector float and the masked IfBranch vector float. In this example, this results in a vector having <r1, d2, r3, d4>. In other words, SIMD pseudocode 550 achieves the same result as the exemplary scalar pseudocode 510, but without the use of a conditional statement—a result vector in each element of the result[] variable, where the vector includes values from the data[] variable in the 1 and 3 positions of the vector and the results of performing the conditional branch in the 0 and 2 positions of the vector (as specified by the mask of 0xFFFFFFFF00000000FFFFFFFF00000000).

Of course, the embodiments described herein are intended to be illustrative and not limiting of the invention, and other embodiments are broadly contemplated. Those skilled in the art will recognize, for example, that other scenarios, such as a scenario in which a mask is not applied repeatedly to the input (i.e., the mask is not applied in a loop) may be supported by embodiments of the invention. Furthermore, embodiments of the invention may be adapted to generate SIMD code replacing other conditional statements, such as an IF statement with multiple ELSE-IF clauses, or a SWITCH-CASE statement.

For example, the scalar code may include a conditional statement with an IF-ELSE block. FIG. 6 illustrates an example of scalar pseudocode 610 representing scalar code 145 with a conditional statement, according to one embodiment of the invention. Specifically, loop 620 includes a FOR loop with an IF-ELSE conditional statement performed in each pass of the loop.

As shown, the pseudocode 610 includes a set of variable declarations 615 for a mask (mask[]), an input (data[]), and an output (result[]). The pseudocode 610 also includes the loop 620 that applies the mask repeatedly to the successive values of the result[] variable (an array of floating point values). The value of mask[i] on each pass of the loop 620 determines what computation is performed on the input (data[i]) and stored as part of the output (result[i]). In particular, for each iteration of the loop, the mask determines whether the computation in the IF clause (i.e., multiplying the value of data[i] by five and storing the result in result[i]) or in the ELSE clause (i.e., multiplying the value of data[i] by seven and storing the result in result[i]) is performed on the input and stored as part of the output.

FIG. 6 also illustrates an example of SIMD pseudocode 650 generated to replace the conditional statement included in loop 620 (i.e., the IF ELSE conditional branching). That is, SIMD pseudocode 650 achieves the same result as the scalar pseudocode 610 without the use of the conditional statement. As shown, the SIMD pseudocode 650 includes variable declarations 655 for vector versions of the mask, input, and output, arrays. That is, the mask[], data[], and result[] are declared as arrays of vector float values (four floating point values for each element of the array). Thus, the FOR loop of pseudocode 610 is performed in pseudocode 650 on four values simultaneously, resulting in pseudocode 650 performing one-fourth of the iterations of loop 620. SIMD pseudocode 650 also includes a loop 660 that applies the mask to successive values of the input[] array. Inside the loop, the elseData vector is assigned the values from the data[] array using the compliment of mask[i %100]. Next, the operations inside the ELSE clause are performed to compute a result for the ELSE clause. Then, a vector AND operation and a vector AND COMPLEMENT operation are used respectively to apply the mask to both the result for the IF clause and the result for the ELSE clause. A final result is computed via a vector OR operation that combines the masked result for the IF clause with the masked result for the ELSE clause. Thus, the SIMD pseudocode 650 achieves the same result as the scalar pseudocode 610, but without the use of a conditional statement. That is, elements in the result[] array store the same values as generated using the conditional branching in code 620 (the IF/ELSE statement).

Figure 7:
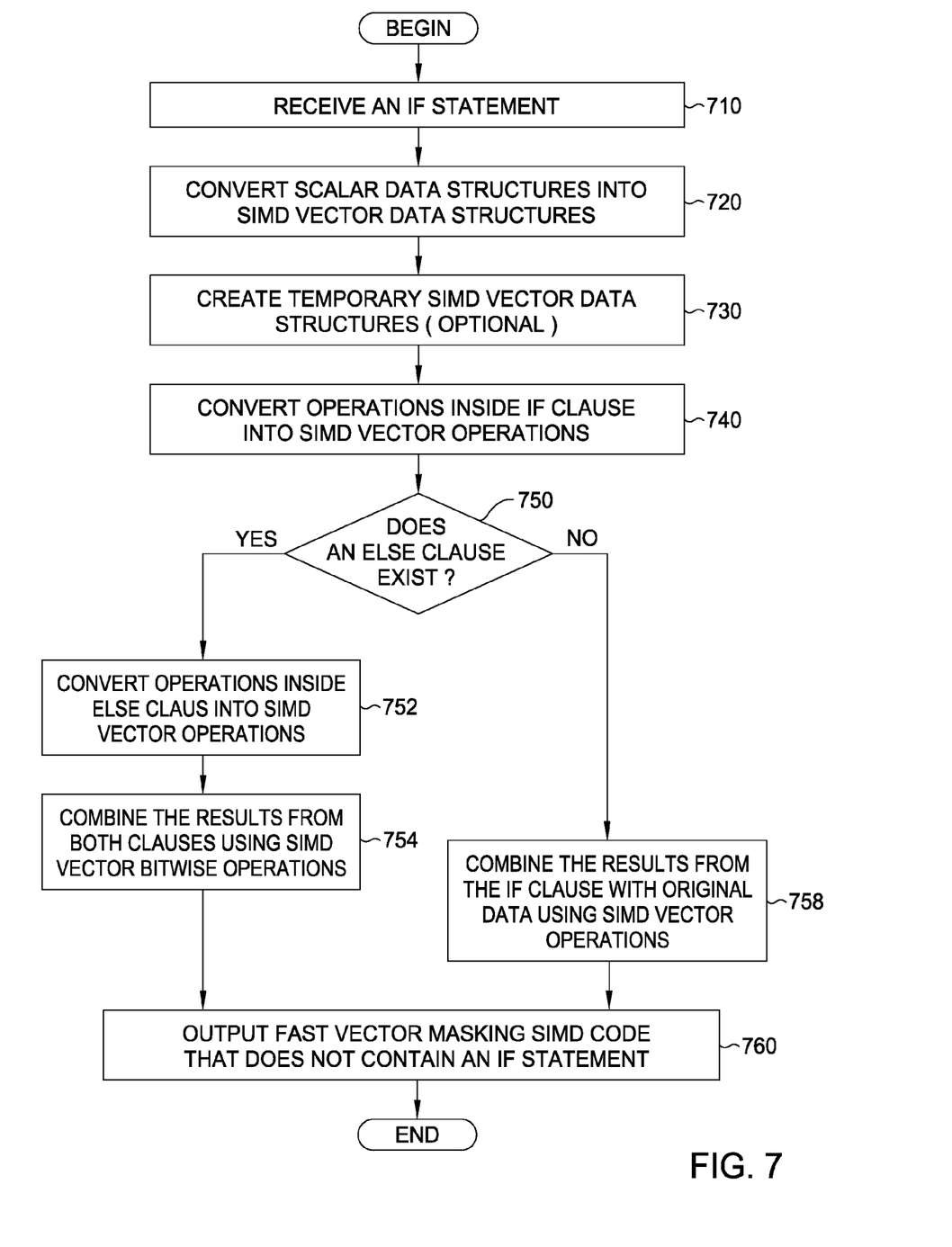
FIG. 7 is a flow diagram that illustrates a method for generating fast vector masking SIMD code from scalar code which includes a conditional statement, according to one embodiment of the invention.

In one embodiment, the fast vector masking SIMD code generator 135 may identify conditional statements within source code and generates SIMD code that removes the conditional statements. FIG. 7 is a flow diagram that illustrates a method 700 for generating fast vector masking SIMD code from scalar code containing a conditional statement, according to one embodiment of the invention. As shown, the method 700 begins at step 710, where scalar code 145 with a conditional statement (such as an IF statement) is received. At step 720, the SIMD code generator 135 identifies the scalar data structures in the code received at step 710 and generates corresponding SIMD vector data structures. As described above, e.g., vector versions of input, mask, and output array data structures are generated. At step 730, the SIMD code generator 135 creates SIMD vector data structures used to assign the results of performing the processing of different code branches of a conditional statement. For example, as described above, vector float values for an IF branch (used to store results of performing logic included inside IF branch) are stored in a variable named ifBranch. Similarly, a mask is applied to the results of the IF branch and stored in a vector named maskedIfBranch. That is, while the ifBranch includes values where each element of the vector is processed using the logic performed when the IF statement is satisfied, the maskedIfBranch has values where such logic is applied only for vector elements that pass through the mask using a logical AND operation. Similarly, a variable named maskedElseBranch stores data values in vector positions that do not pass through the mask (determined using a logical complement of the mask value ANDed with the input data). More generally, at step 720, vector data structures may be created to store results for each branch of a conditional statement.

At step 740, the SIMD code generator 135 generates code to perform the logic inside a conditional statement (i.e., the logic preformed when the conditional statement is satisfied). As shown in FIG. 6, e.g., arithmetic multiplication of scalar elements in a scalar array (result[i]=5*data[i]) are converted into vector multiplication for elements of a vector array (ifBranch=vec_mul(data[i], (vector float)5.0;) At step 750, the SIMD code generator 135 determines whether an ELSE clause exists (or more generally, whether additional conditional branches include execution logic, e.g., the else clause of loop 620 in FIG. 6). If so, at step 752, the SIMD code generator 135 generates code corresponding to the ELSE clause into using SIMD vector operations. As shown in FIG. 6, e.g., arithmetic multiplication of scalar elements in a scalar array (result[i]=7*data[i]) in the ELSE clause are converted into vector multiplication for elements of a vector array (elseBranch=vec_mul(data[i], (vector float)7.0);).

At step 754, the SIMD code generator 135 generates SIMD code to merge the results from both clauses using SIMD vector bitwise operations, e.g., using the mask values to select from either the "ifBranch" results or the "elseBranch" results. For example, vector AND and ANDC operations may be used to mask the results determined for each branch of the conditional statement. A final result may then be determined using vector OR operations on the results. At step 760, the SIMD code generator 135 outputs fast vector masking SIMD code that does not contain an IF statement. Specifically, the SIMD code generator 135 outputs SIMD code generated in steps 720 thru 754. After step 760, method 700 terminates.

At step 750, however, the SIMD code generator 135 may determine that an ELSE clause does not exist. That is, in some cases, a conditional statement may include execution logic performed when the conditional statement is satisfied, but not specify alternative logic to perform when the conditional statement is not satisfied. In this case, at step 758, the SIMD code generator 135 generates code to merge the results from the IF clause with the original data using SIMD operations. For example, vector AND and ANDC operations may be used to mask the respective results for each branch of the conditional statement. The final result may then be determined using vector OR operations on the results. At step 760, the SIMD code generator 135 outputs SIMD code that does not contain an IF statement. Specifically, the SIMD code generator 135 outputs SIMD code generated in steps 720 thru 758. After step 760, method 700 terminates.

In one embodiment, if the mask needs to be calculated at runtime, the mask may be calculated prior to the conditional masking code. Alternatively, the mask may also be calculated in synchronization with the branch removal code, so that each vector mask element is available immediately prior to each data processing iteration. Doing so may be useful in stream type processing applications for automated real time decision making.

Advantageously, embodiments of the invention provide a SIMD code generator the SIMD code generator 135 configured to identify conditional statements within source code and generate SIMD code to replace the conditional statements with code that provides the same results, without requiring the branching code to be performed. In one embodiment, the SIMD code generator 135 receives scalar code containing a conditional statement. The SIMD code generator 135 compiler generates data structures and operations corresponding to the scalar code using vector based data structures and using vector bitwise operations to combine results for each branch of the conditional statement.

Of course, the embodiments described herein are intended to be illustrative and not limiting of the invention, and other embodiments are broadly contemplated. Those skilled in the art will recognize, for example, that while embodiments are described above using C++ like programming syntax, other programming languages, such as C and Java, may be supported by embodiments of the invention. Further, bit masking operations implemented using a floating point mask, vector NOT operations, and vector multiplication operations (instead of an unsigned int mask, vector AND operations, and vector AND COMPLEMENT operations) may be supported by embodiments of the invention.

While the foregoing is directed to embodiments of the present invention, other and further embodiments of the invention may be devised without departing from the basic scope thereof, and the scope thereof is determined by the claims that follow.

What is claimed is:

1. A computer-implemented method to avoid pipeline stalls associated with conditional statements in scalar source code by converting the conditional statements into at least bitwise vector operations, the method comprising:
 receiving the scalar source code containing a conditional statement, wherein each branch of the conditional statement specifies: (i) a scalar data structure and (ii) a scalar operation operating on the scalar data structure;
 generating vector masking source code from the received scalar source code by operation of one or more computer processors and to avoid pipeline stalls associated with the conditional statement in the received scalar source code, by converting the conditional statement into at least one bitwise vector operation, wherein the generated vector masking source code does not include any conditional statement and includes: (i) for each branch of the conditional statement, a vector data structure that corresponds to the scalar data structure in the respective branch of the conditional statement; (ii) for each branch of the conditional statement, a vector operation that corresponds to the scalar operation in the respective branch of the conditional statement, wherein the scalar operation operates on the scalar data structure and wherein the vector operation operates on the vector data structure to compute a result for the respective branch of the conditional statement; and (iii) the at least one bitwise vector operation, which is configured to compute a final result based on the respective results for each branch of the conditional statement; and outputting the generated vector masking source code.

2. The method of claim 1, wherein the final result is computed by combining the results from each branch of the conditional statement using the at least one bitwise vector operation.

3. The method of claim 2, wherein the corresponding vector operation is a single instruction multiple data (SIMD) vector operation, wherein the corresponding vector data structure is a SIMD vector data structure, and wherein the at least one bitwise vector operation comprises at least one SIMD bitwise operation.

4. The method of claim 3, wherein the at least one bitwise vector operation is selected from at least a bitwise AND operation, a bitwise AND COMPLEMENT operation, and a bitwise OR operation.

5. The method of claim 4, wherein the final result is computed by combining the results from each branch of the conditional statement using a vector multiply operation and a bitwise OR operation.

6. The method of claim 5, further comprising:
compiling the generated source code to generate object code configured to execute a specified target architecture; and
executing the object code on the specified target architecture.

7. The method of claim 6, wherein the conditional statement is an IF statement evaluated using a mask value, wherein the conditional statement includes a plurality of branches for which branch prediction is performed, wherein the branch prediction incurs pipeline stalls;

wherein each branch of the conditional statement specifies a distinct scalar operation on the scalar data structure, wherein the generated vector masking source code includes, for each distinct scalar operation, a corresponding, distinct vector operation performed unconditionally on a respective vector copy of the scalar data structure to produce an intermediate vector result for each branch of the conditional statement;

wherein the final result is determined by masking and then performing the bitwise OR operation on the produced intermediate vector results, wherein a different mask is applied to each intermediate vector result, wherein the bitwise OR operation is included in the generated vector masking source code;

wherein the produced intermediate vector results are masked via at least one of the bitwise AND operation and the bitwise AND COMPLEMENT operation in the generated vector masking source code;

wherein the scalar data structure is masked using a mask different from the masks applied to the intermediate vector results, wherein the bitwise OR operation is performed on the masked scalar data structure and with the intermediate vector results, wherein the masked scalar data structure represents a branch of the conditional statement in which no scalar operation is performed;

wherein the scalar data structure is not masked if each branch of the conditional statement has a corresponding scalar operation that is performed.

8. A computer readable storage medium containing a program which, when executed, performs an operation to avoid pipeline stalls associated with conditional statements in scalar source code by converting the conditional statements into at least bitwise vector operations, the operation comprising:

receiving the scalar source code containing a conditional statement, wherein each branch of the conditional statement specifies: (i) a scalar data structure and (ii) a scalar operation operating on the scalar data structure;

generating, by operation of one or more computer processors when executing the program, vector masking source code from the received scalar source code and to avoid pipeline stalls associated with the conditional statement in the received scalar source code, by converting the conditional statement into at least one bitwise vector operation, wherein the generated vector masking source code does not include any conditional statement and includes: (i) for each branch of the conditional statement, a vector data structure that corresponds to the scalar data structure in the respective branch of the conditional statement; (ii) for each branch of the conditional statement, a vector operation that corresponds to the scalar operation in the respective branch of the conditional statement, wherein the scalar operation operates on the scalar data structure and wherein the vector operation operates on the vector data structure to compute a result for the respective branch of the conditional statement; and (iii) the at least one bitwise vector operation, which is configured to compute a final result based on the respective results for each branch of the conditional statement; and outputting the generated vector masking source code.

9. The computer-readable storage medium of claim 8, wherein the final result is computed by combining the results from each branch of the conditional statement using the at least one bitwise vector operation.

10. The computer-readable storage medium of claim 9, wherein the corresponding vector operation is a SIMD vector operation, wherein the corresponding vector data structure is a SIMD vector data structure, and wherein the at least one bitwise vector operation comprises at least one SIMD bitwise operation.

11. The computer-readable storage medium of claim 10, wherein the at least one bitwise vector operation is selected from at least a bitwise AND operation, a bitwise AND COMPLEMENT operation, and a bitwise OR operation.

12. The computer-readable storage medium of claim 11, wherein the final result is computed by combining the results from each branch of the conditional statement using a vector multiply operation and a bitwise OR operation.

13. The computer-readable storage medium of claim 12, wherein the operation further comprises:
compiling the generated source code to generate object code configured to execute a specified target architecture; and
executing the object code on the specified target architecture.

14. The computer-readable storage medium of claim 13, wherein the conditional statement is an IF statement evaluated using a mask value, wherein the conditional statement includes a plurality of branches for which branch prediction is performed, wherein the branch prediction incurs pipeline stalls;

wherein each branch of the conditional statement specifies a distinct scalar operation on the scalar data structure, wherein the generated vector masking source code includes, for each distinct scalar operation, a corresponding, distinct vector operation performed unconditionally on a respective vector copy of the scalar data structure to produce an intermediate vector result for each branch of the conditional statement;

wherein the final result is determined by masking and then performing the bitwise OR operation on the produced intermediate vector results, wherein a different mask is applied to each intermediate vector result, wherein the bitwise OR operation is included in the generated vector masking source code;

wherein the produced intermediate vector results are masked via at least one of the bitwise AND operation and the bitwise AND COMPLEMENT operation in the generated vector masking source code;

wherein the scalar data structure is masked using a mask different from the masks applied to the intermediate vector results, wherein the bitwise OR operation is performed on the masked scalar data structure and with the intermediate vector results, wherein the masked scalar data structure represents a branch of the conditional statement in which no scalar operation is performed;

wherein the scalar data structure is not masked if each branch of the conditional statement has a corresponding scalar operation that is performed.

15. A system to avoid pipeline stalls associated with conditional statements in scalar source code by converting the conditional statements into at least bitwise vector operations, the system comprising:

a processor; and a memory containing a program, which when executed by the processor is configured to perform an operation comprising:

receiving the scalar source code containing a conditional statement, wherein each branch of the conditional statement specifies: (i) a scalar data structure and (ii) a scalar operation operating on the scalar data structure;

generating vector masking source code from the received scalar source code and to avoid pipeline stalls associated with the conditional statement in the received scalar source code, by converting the conditional statement into at least one bitwise vector operation, wherein the generated vector masking source code does not include any conditional statement and includes: (i) for each branch of the conditional statement, a vector data structure that corresponds to the scalar data structure in the respective branch of the conditional statement; (ii) for each branch of the conditional statement, a vector operation that corresponds to the scalar operation in the respective branch of the conditional statement, wherein the scalar operation operates on the scalar data structure and wherein the vector operation operates on the vector data structure to compute a result for the respective branch of the conditional statement; and (iii) the at least one bitwise vector operation, which is configured to compute a final result based on the respective results for each branch of the conditional statement; and outputting the generated vector masking source code.

16. The system of claim 15, wherein the final result is computed by combining the results from each branch of the conditional statement using the at least one bitwise vector operation.

17. The system of claim 16, wherein the corresponding vector operation is a SIMD vector operation, wherein the corresponding vector data structure is a SIMD vector data structure, and wherein the at least one bitwise vector operation comprises at least one SIMD bitwise operation.

18. The system of claim 17, wherein the at least one bitwise vector operation is selected from at least a bitwise AND operation, a bitwise AND COMPLEMENT operation, and a bitwise OR operation.

19. The system of claim 18, wherein the final result is computed by combining the results from each branch of the conditional statement using a vector multiply operation and a bitwise OR operation.

20. The system of claim 19, wherein the operation further comprises:

compiling the generated source code to generate object code configured to execute a specified target architecture; and executing the object code on the specified target architecture.

21. The system of claim 20, wherein the conditional statement is an IF statement evaluated using a mask value, wherein the conditional statement includes a plurality of branches for which branch prediction is performed, wherein the branch prediction incurs pipeline stalls;

wherein each branch of the conditional statement specifies a distinct scalar operation on the scalar data structure, wherein the generated vector masking source code includes, for each distinct scalar operation, a corresponding, distinct vector operation performed unconditionally on a respective vector copy of the scalar data structure to produce an intermediate vector result for each branch of the conditional statement;

wherein the final result is determined by masking and then performing the bitwise OR operation on the produced intermediate vector results, wherein a different mask is applied to each intermediate vector result, wherein the bitwise OR operation is included in the generated vector masking source code;

wherein the produced intermediate vector results are masked via at least one of the bitwise AND operation and the bitwise AND COMPLEMENT operation in the generated vector masking source code;

wherein the scalar data structure is masked using a mask different from the masks applied to the intermediate vector results, wherein the bitwise OR operation is performed on the masked scalar data structure and with the intermediate vector results, wherein the masked scalar data structure represents a branch of the conditional statement in which no scalar operation is performed;

wherein the scalar data structure is not masked if each branch of the conditional statement has a corresponding scalar operation that is performed.

* * * * *